"(12) United States Patent
Barnes et al.

(10) Patent No.: US 7,986,217 B2
(45) Date of Patent: Jul. 26, 2011

(54) MITIGATING PROCESSING LATENCY IN RFID EXCHANGES

(75) Inventors: Thomas J. Barnes, Beaverton, OR (US); Marc A. Loyer, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 971 days.

(21) Appl. No.: 11/863,240

(22) Filed: Sep. 27, 2007

(65) Prior Publication Data
US 2009/0085748 A1   Apr. 2, 2009

(51) Int. Cl.
*H04Q 5/22*   (2006.01)
(52) U.S. Cl. .................. 340/10.1; 340/10.2; 340/10.32; 455/42
(58) Field of Classification Search .............. 340/572.4, 340/572.1, 10.1, 10.32, 10.3, 10.2; 370/310–313, 370/276, 338, 352; 455/42
See application file for complete search history.

(56) References Cited

U.S. PATENT DOCUMENTS

| | | | |
|---|---|---|---|
| 6,765,901 B1 * | 7/2004 | Johnson et al. | 370/352 |
| 7,401,740 B2 * | 7/2008 | Becker et al. | 235/487 |
| 7,821,378 B2 * | 10/2010 | Bae et al. | 340/10.2 |
| 2007/0236335 A1 * | 10/2007 | Aiouaz et al. | 340/10.32 |
| 2008/0297309 A1 * | 12/2008 | Loyer | 340/10.1 |
| 2009/0040394 A1 * | 2/2009 | Nusseck et al. | 348/744 |

* cited by examiner

*Primary Examiner* — Benjamin C Lee
*Assistant Examiner* — Peter C Mehravari
(74) *Attorney, Agent, or Firm* — John F. Travis

(57) ABSTRACT

In a radio frequency identification (RFID) system that requires an RFID reader to receive a response from an RFID tag and then transmit a command to the RFID tag within a certain time period, the RFID reader may place an initial part of the command transmission in the RFID reader's transmit chain before receiving the entire response from the RFID tag, and complete the command transmission after receiving the entire response.

20 Claims, 4 Drawing Sheets

MITIGATING PROCESSING LATENCY IN RFID EXCHANGES

BACKGROUND

As radio frequency identification (RFID) technology has become more advanced, more complexity is being incorporated into communications exchanges between RFID readers and RFID tags. In the communications protocol specified in industry standard ISO-18000-6(c), after an RFID reader polls an RFID tag and after the reader receives a response from the tag, the RFID reader must transmit a command back to the tag within a defined time period. Since the response received from the tag is generally processed through a digital signal processor (DSP) in the reader before it can be interpreted, and since the command is generally processed through a DSP in the reader before it is actually transmitted, these processing latencies add to the turnaround time that the RFID tag experiences between transmitting the response and receiving the command. In addition, a framesync symbol must be transmitted at the beginning of the command, further reducing the available defined time period. In an environment with many RFID tags, the cumulative effect of these delays can reduce overall system throughput, and may cause some of the communications exchanges to fail because of time-out issues.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
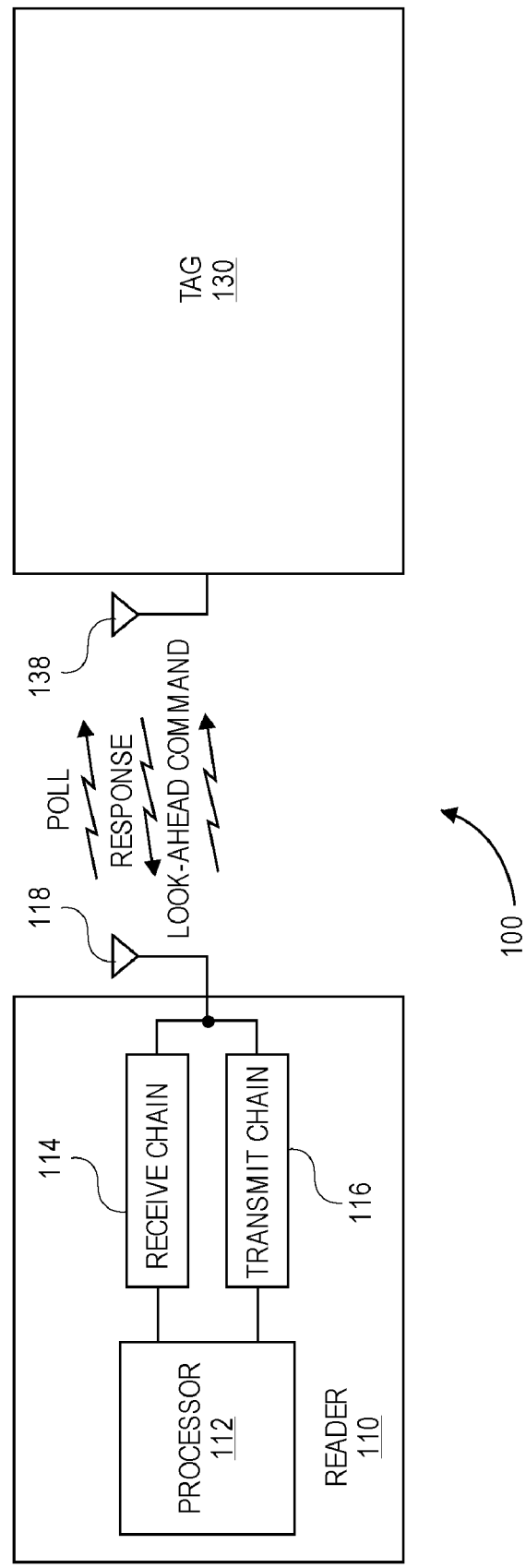
FIG. 1 shows a block diagram of an RFID system, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" indicates that two or more elements are in direct physical or electrical contact with each other. "Coupled" indicates that two or more elements co- operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be physically in motion while it is communicating.

Within the context of this document, an RFID tag (sometimes referred to as an RFID transponder) is a device that responds to an interrogating signal from an RFID reader by transmitting a response containing at least the identification code of the RFID tag. "Transmitting" a signal from an RFID tag includes reflecting a modulated version of the received carrier signal (sometimes called backscattering). Within the context of this document, an RFID reader (sometimes called an RFID interrogator) is a device that wirelessly receives the aforementioned response. In some embodiments an RFID reader may also transmit data and/or commands to the RFID tag, which may affect the response from the RFID tag. A 'passive RFID tag' is an RFID tag that obtains its operating power by harvesting energy from the radio frequency signal received through its antenna, while an 'active RFID tag' is an RFID tag that obtains its operating power by being connected to a battery or other physically tangible power source (e.g., a power supply). Either type of tag may use the reflected, or backscattered, modulation method to communicate with the RFID reader.

In various embodiments of the invention, after triggering an RFID tag to transmit a response to a poll, the RFID reader may begin transmitting a command to the RFID tag before the entire response from the tag has been received, thus reducing the chances that the command will be transmitted after a specified maximum allowable time has expired. In some embodiments, the response from the tag will contain information on the length of that response, and this information may be used to calculate how early to begin transmitting the command, so that the start of the command will be received by the tag after the tag completes transmitting the response, but before expiration of the maximum allowable time. In some embodiments, the protocol of the response and the command will conform to the protocol specified in industry standard ISO 18000-6C, published in 2005 by the International Standards Organization.

FIG. 1 shows a block diagram of an RFID system, according to an embodiment of the invention. In the illustrated system 100, an RFID reader 110 may exchange wireless communications with an RFID tag 130. In the example, the RFID reader 110 transmits a poll to the RFID tag 130, causing the RFID tag 130 to transmit a response, which in turn causes the RFID reader 110 to transmit a look-ahead command to the RFID tag 130. Within the context of this document, a 'look-ahead command' is a transmission to an RFID tag (or to a group address for multiple RFID tags) and which contains a command field directed to the RFID tag(s), in which the initial part of the transmission is submitted to the transmit chain before the contents of the remainder of the transmission have been determined. The communications exchange may also include communications before and/or after these three (poll/response/command), but are not shown to avoid obscuring the details of the embodiments of the invention with unnecessary complexity. For the purposes of this document, a poll may be any feasible communication from an RFID reader 110 that triggers a response from the RFID tag 130, such as but not limited to a single transmission, or the last of multiple transmissions from the reader to the tag. In some operations, a poll may elicit a response from multiple RFID tags, but the following descriptions only apply to one of those multiple tags. The remaining tags may be handled separately and/or sequentially, but with similar techniques.

The RFID reader 110 may comprise a processor 112, one or more antennas 118, areceive chain 114, and atransmit chain 116. The RFID tag 130 may be one of perhaps many RFID tags that can communicate with the RFID reader 110. The internal details of the RFID tag 130 may not be involved with the inventive aspects of various embodiments of the invention, and those details are therefore not described.

For the purposes of this document, a transmit chain will be defined as that portion of the device that takes the digital data that is to be transmitted, converts the data into the proper signals, with the proper timing, for transmission through the antenna, and provides those signals to the antenna. Similarly, a receive chain will be defined as that portion of the device that receives signals from the antenna, coverts those signals and the associated timing into digital data, and provides that digital data for further handling. Various types of circuitry may be used in the transmit and receive chains, such as but not limited to shift registers, buffers, state machines, and/or digital signal processors (DSPs). In some embodiments the transmit chain and receive chain may share certain resources (for example, the DSP), but the various embodiments of the invention should not be limited in that respect.

Figure 2:
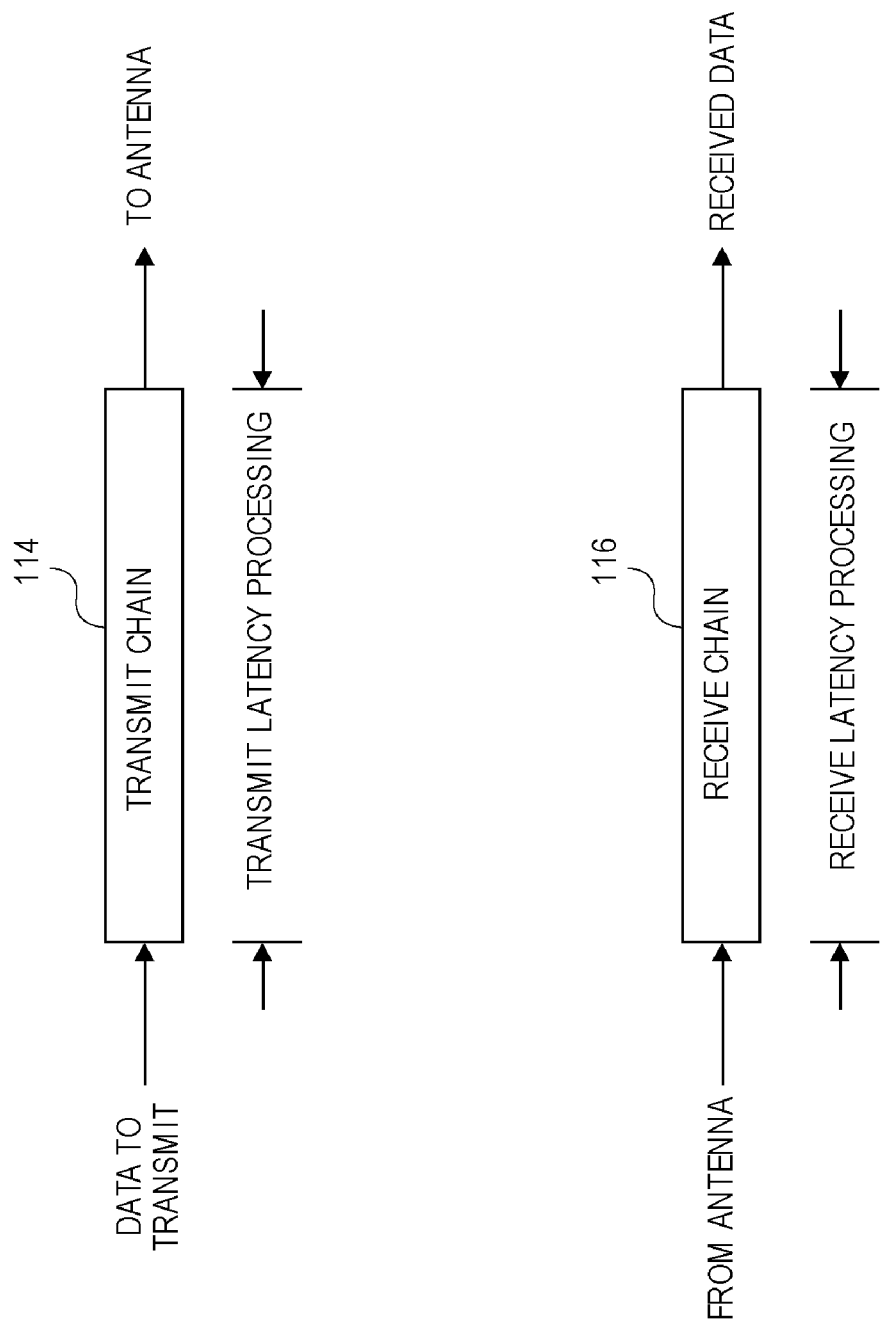
FIG. 2 shows a correspondence between latency and the transmit and receive chains, according to an embodiment of the invention.

FIG. 2 shows a correspondence between latency and the transmit and receive chains, according to an embodiment of the invention. Transmit latency is the time it takes for data to move through the transmit chain, i.e., the time to take the digital data that is to be transmitted, convert that data to the proper radio frequency (RF) signals, and provide those RF signals to the antenna. The circuitry to perform these functions is included in the transmit chain 114. Similarly, receive latency is the time it takes for the receive chain to take RF signals from the antenna, convert those signals into the proper digital data, and provide that digital data for further handling. The circuitry to perform these functions is included in the receive chain 116. Values for transmit latency and receive latency may be contained within the RFID reader, and may be determined through various means, so that these parameters will be available for use when needed. These means may include, but are not limited to, such things as: 1) the values being programmed or hard-coded into the RFID reader at the time of manufacture, 2) testing the RFID reader after manufacture and programming these values into it, 3) dynamically determining these values in field operations by conducting loop-back tests between the RFID reader and the RFID tag, 4) etc.

Although it takes a finite amount of time for the wireless signals to travel from the transmitting antenna to the receiving antenna, in most instances this time will be considered to be comparatively negligible and therefore is not included in the latency considerations. Similarly, signal processing latency in the RFID tag is considered to be either negligible or not a relevant factor, and is therefore not included in the latency considerations.

In general, the program instructions, state machine, or other logic that processes the digital data and tries to execute certain functions at a certain time is on the processor side of the transmit and receive chains, not on the antenna side. Accordingly, for transmit and receive timing functions that are determined in the processor, the RFID reader must adjust its timing determinations to accommodate for the latencies caused by these chains.

Figure 3:
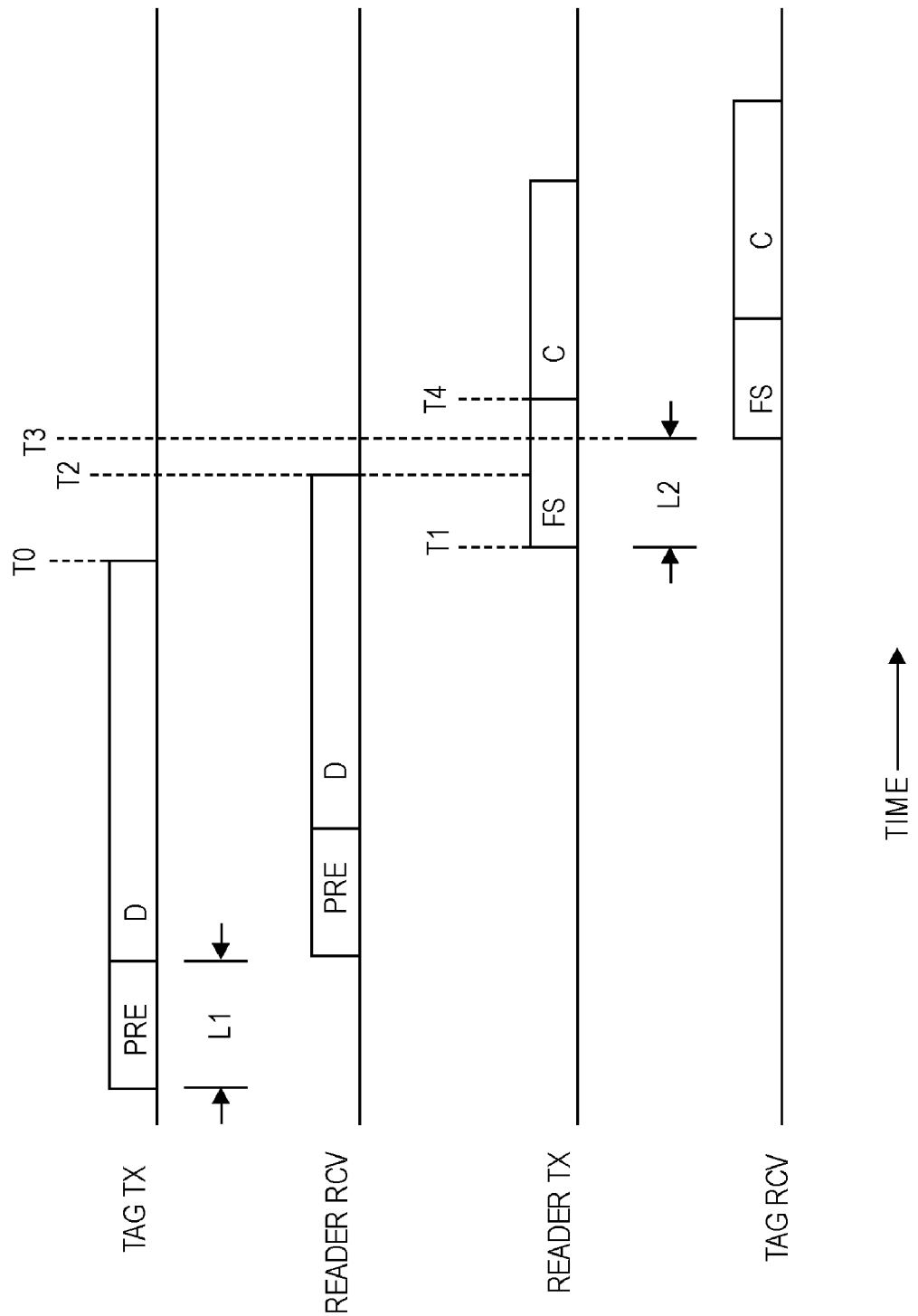
FIG. 3 shows a timing diagram of a wireless communications exchange between an RFID reader and an RFID tag, according to an embodiment of the invention.

FIG. 3 shows a timing diagram of a wireless communications exchange between an RFID reader and an RFID tag, according to an embodiment of the invention. Four different sets of data are shown. TAG TX shows a transmission from the RFID tag, while READER RCV shows when that same transmission is received at the RFID reader. These transmissions are shown with a preamble (PRE), followed by the actual data (D) being transmitted. In some embodiments, the preamble may contain, among other things, information on the length of the transmission so that the receiving device may determine when the end of the transmission will occur, before actually encountering that end.

Similarly, READER TX shows a transmission from the RFID reader, while TAG RCV shows when that same transmission is received at the RFID tag. These transmissions are shown with an initial framesync symbol (FS), followed by a command field (C) that indicates which command is being given to the RFID tag. Transmissions from the RFID reader and/or RFID tag may also include other fields not mentioned. Although the terms preamble and framesync are being used here, various embodiments of the invention may not be limited to devices using that terminology.

Because any signal processing latency that might occur within the RFID tag is considered negligible or not relevant, TAG TX and TAG RCV show timing for signals at the RFID tag antenna. Conversely, READER RCV shows received data being received from the RFID reader's receive chain, after the latency of the reader's receive chain is experienced, while READER TX shows data for transmission being presented to the RFID reader's transmit chain, before the reader's transmit latency is experienced.

As indicated above, and illustrated in FIG. 2, the latency L1 from TAG TX to READER RCV consists of the receive latency in the RFID reader. Based on this, the tag will stop transmitting at time T0, and a period of time L1 will elapse before the reader actually perceives the end of that transmission at time T2. The value L1 may be used by the RFID reader to determine how soon the tag will be ready to receive a transmission from the reader. In a similar manner, the latency L2 from the READER TX to the TAG RCV consists of the RFID reader's transmit latency. Based on this, the tag will begin receiving a transmission from the reader at time T3, which is a period of time L2 after the reader presents that data to its transmit chain at T1. L2 may be used to determine how soon the reader should provide data to the transmit chain in order for that data to arrive at the tag at a certain time.

In certain RFID communications protocols, the RFID reader is supposed to transmit a command to the RFID tag after receiving a response (to a previous poll) from the RFID tag. This command is supposed to be received by the tag within a certain time period after the RFID tag transmits its response. Because the turnaround time in this exchange includes both L1 and L2, it may sometimes be difficult in conventional systems to complete the exchange in the allocated time, and the exchange may fail. Further complicating the situation is that the particular command to be transmitted may be dependent on the contents of the response, so the reader may not know what command to transmit until it receives the entire response at T0.

However, in many operations, the initial part of the command contains a known symbol that will be the same for all commands. This initial part is labeled here as a framesync, although some embodiments of the invention may not be limited to devices using that label. The RFID reader may begin transmitting this symbol before it determines what the rest of the command will contain, provided: 1) the reader determines what the rest of the command will be before it has to present the rest of the command to its own transmit chain (this may depend partly on the length of the framesync symbol), and 2) the initial part of the command won't be received at the RFID tag's antenna until after the RFID tag has completed transmitting its response and is ready to receive. This principal is illustrated in FIG. 3.

As shown for READER TX, the reader presents the framesync (FS) symbol to its transmit chain at time T1, which is before the response from the tag has been completely received from the reader's receive chain at T2. However, by the time the reader must present the rest of the command to its transmit chain at T4, it has received and decoded the entire response from the tag at T2. The RFID reader thus has sufficient information to select the proper command contents for transmission, and can begin presenting the C portion of the transmission to its transmit chain.

After latency L2, the framesync is received at the RFID tag's antenna at T3. Since the tag completed transmitting its response at T0, it is ready to receive incoming signals by time T3, and the entire command (FS+C) can be properly received and decoded. Note: although the diagram shows time T0 occurring before time T1, this may not be a necessary requirement. In some instances, the RFID reader may present the framesync symbol to its transmit chain at T1 before the RFID tag has completed transmitting its response at T0, provided the framesync is not received at the RFID tag's antenna before the RFID tag completes transmitting its response (i.e., T1 may occur before T0, but T3 may not occur before T0).

Figure 4:
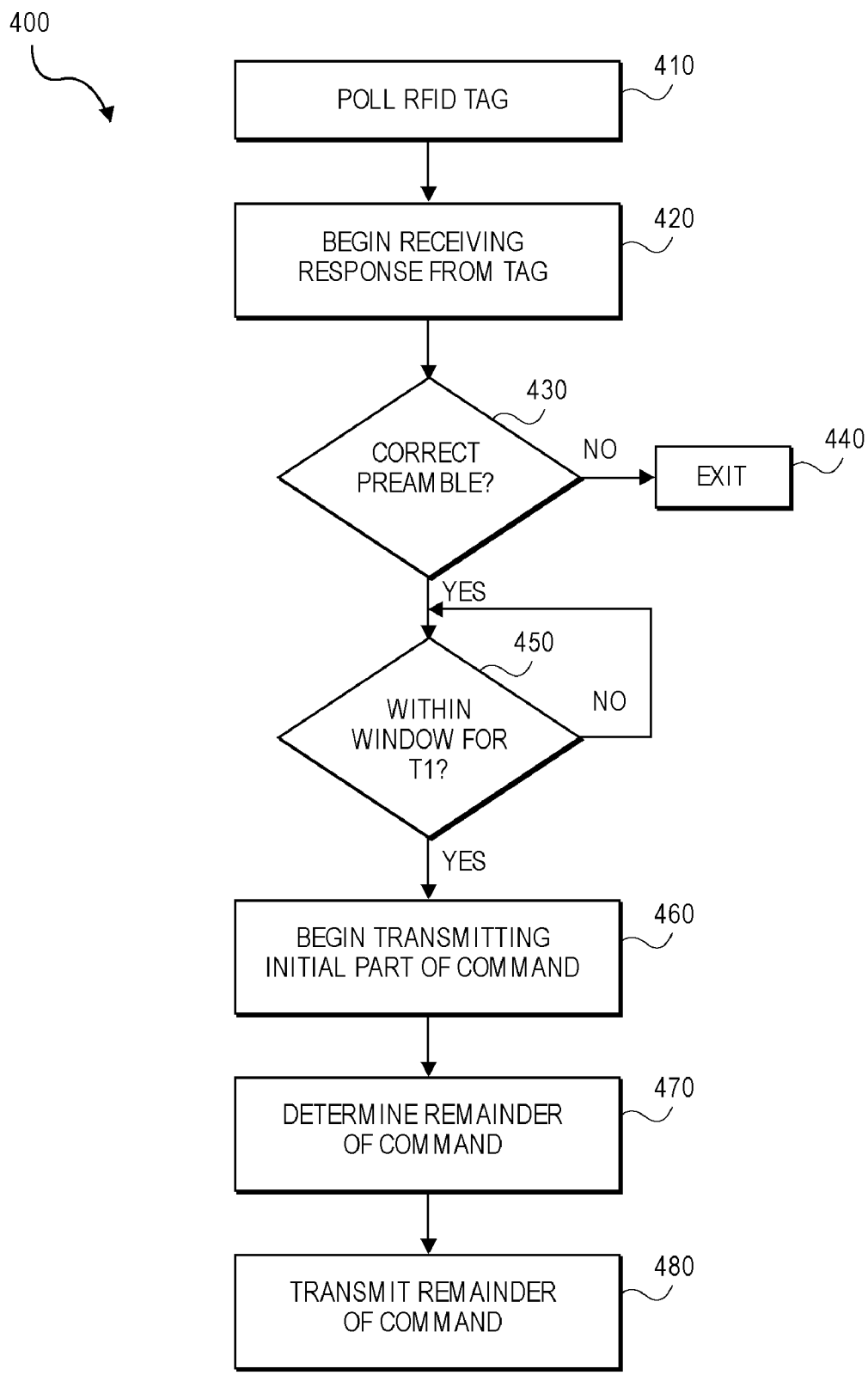
FIG. 4 shows a flow diagram of a method of transmitting a look-ahead command to an RFID tag, according to an embodiment of the invention.

FIG. 4 shows a flow diagram of a method of transmitting a look-ahead command to an RFID tag, according to an embodiment of the invention. For the purposes of this document, any portion of the command transmission that is standardized for all commands, and therefore known in advance (for example, a framesync symbol), may be encompassed by the term 'command'.

In flow diagram 400, which may be performed by an RFID reader, at 410 the RFID reader polls an RFID tag. This poll may be any feasible transmission that causes a particular RFID tag to respond with a transmission containing its own identification code. In some operations, the poll may be a single transmission that triggers a response from a single RFID tag. In other operations, the poll may be the last in a series of transmissions from the RFID reader that are intended to elicit a response from a single RFID tag or from a group of similarly-addressed RFID tags. The RFID reader begins receiving that response from an RFID tag at 420. In instances in which multiple RFID tags each transmit a response to the same poll, those responses may be separated in time to avoid interfering with each other, and the rest of the flow diagram is directed to the response from one of those tags.

At 430 the initial part of the response is decoded to determine if the preamble is correct. If it is not, processing may exit at 440 to another process not described here. A preamble may be considered incorrect for any of numerous reasons, such as but not limited to: 1) the received preamble is corrupted due to a weak signal, interference by signals from another RFID tag, etc., 2) the preamble contents indicate it is from an RFID tag that was not expected to respond, 3) the preamble has an incorrect format, 4) etc.

After determining that the preamble is correct and that the RFID tag's response should be followed by a command from the RFID reader, the RFID reader may prepare to transmit that command. However, the timing of transmitting that command should meet certain conditions. If transmitted too soon, the initial part of the command will arrive at the antenna of the RFID tag while the RFID tag is still transmitting its response, and the tag will therefore be unable to correct receive and decode the command. If transmitted to late, the RFID tag will experience a time-out, and will not accept the command. Therefore, the RFID reader may wait at 450 until it is within an acceptable timing window to begin transmitting the initial part of the command at 460. This timing window for T1 will assure that T3 is subsequent to T0 (see FIG. 3), but that T3 occurs before the RFID tag times out. If it is already too late to meet this window before processing reaches 450, the operation may be aborted (not shown), but in some operations this should be a relatively rare occurrence. In embodiments in which the length of the response from the RFID tag is variable, or at least is not known in advance, that length may be encoded into the response (for example, in the preamble). In such instances, the timing of the window may depend on receiving and decoding that length, determining when the end of the response will occur, and using that information to calculate when the window will occur.

After receiving and decoding the rest of the response from the RFID tag, the RFID reader may determine the proper command to send to the RFID tag (i.e., it may determine at 470 what the contents of the remainder of the command should be). The RFID reader may then compose the remainder of the command, and append that remainder to the initial part of the command transmission by presenting that remainder to the transmit chain. In some embodiments, the 'initial' part of the command extends through the end of the framesync symbol, while the 'remainder' of the command may be everything else in the transmission that follows the framesync symbol.

The foregoing description is intended to be illustrative and not limiting. Variations will occur to those of skill in the art. Those variations are intended to be included in the various embodiments of the invention, which are limited only by the spirit and scope of the following claims.

What is claimed is:
1. An apparatus, comprising
a radio frequency identification (RFID) reader containing a processor, a receive chain to be coupled between the processor and an antenna, and a transmit chain to be coupled between the processor and the antenna, the RFID reader to:

receive a response from a particular RFID tag, the response containing an indication of a length of the response;

process the response in the receive chain;

present, resultant to said response, an initial part of a command to the transmit chain before processing all of the response in the receive chain; and time the presentation of the initial part, based at least partly on the indication of length, such that a start of the command will be received by the RFID tag after the RFID tag completes transmitting the response.

2. The apparatus of claim 1, wherein a time to begin said presentation of the initial part is based at least partly on at least one of:

a determination of latency in the receive chain; and a determination of latency in the transmit chain.

3. The apparatus of claim 1, wherein a timing of said presenting the initial part is based at least partly on decoding a final part of the response before completion of transmitting a framesync symbol in the command.

4. The apparatus of claim 1, wherein the indication of the length is contained in a preamble of the response.

5. The apparatus of claim 1, wherein the protocols and timing of the response and the command conform to requirements of international standards document ISO 18000-6C published in 2005.

6. The apparatus of claim 1, further comprising the antenna coupled to the transmit chain and to the receive chain.

7. The apparatus of claim 1, wherein the RFID reader contains information about a processing latency of the transmit chain.

8. The apparatus of claim 1, wherein the RFID reader contains information about a processing latency of the receive chain.

9. A method, comprising:

decoding in a receive chain of a radio frequency identification (RFID) reader, an initial part of a first transmission received from a radio frequency identification (RFID) tag;

processing in a transmit chain of the RFID reader, resultant to the initial part and subsequent to said decoding the initial part but before decoding a final part of the first transmission in the receive chain, an initial part of a second transmission to be wirelessly transmitted to the RFID tag; and processing in the transmit chain, subsequent to decoding the final part of the first transmission, a remaining part of the second transmission;

wherein the processing in the transmit chain is timed such that the initial part of the second transmission will be received by the RFID tag subsequent to the RFID tag transmitting the final part of the first transmission.

10. The method of claim 9, wherein said decoding the initial part of the first transmission comprises decoding a preamble.

11. The method of claim 9, wherein said processing the initial part of the second transmission comprises processing a framesync symbol.

12. The method of claim 9, further comprising basing a timing of the processing of the initial part of the second transmission at least partly on at least one of:

a latency in the receive chain of the RFID reader; and a latency in the transmit chain of the RFID reader.

13. The method of claim 9, further comprising basing a timing of the processing of the initial part of the second transmission at least partly on a duration of the first transmission.

14. The method of claim 9, further comprising basing a timing of the processing of the initial part of the second transmission at least partly on a duration of the initial part of the second transmission and at least partly on an expected duration of the final part of the first transmission.

15. An article comprising a tangible machine-readable medium that contains instructions, which when executed by one or more processors result in performing operations comprising:

decoding in a receive chain of a radio frequency identification (RFID) reader, an initial part of a first transmission received from a radio frequency identification (RFID) tag;

processing in a transmit chain of the RFID reader, resultant to the initial part and subsequent to said decoding the initial part but before decoding a final part of the first transmission in the receive chain, an initial part of a second transmission to be wirelessly transmitted to the RFID tag; and processing in the transmit chain, subsequent to decoding the final part of the first transmission, a remaining part of the second transmission;

wherein the processing in the transmit chain is timed such that the initial part of the second transmission will be received by the RFID tag subsequent to the RFID tag transmitting the final part of the first transmission.

16. The article of claim 15, wherein the operation of decoding the initial part of the first transmission comprises decoding a preamble.

17. The article of claim 15, wherein the operation of processing the initial part of the second transmission comprises processing a framesync symbol.

18. The article of claim 15, wherein the operations further comprise basing a timing of the processing of the initial part of the second transmission at least partly on at least one of:

a latency in the receive chain of the RFID reader; and a latency in the transmit chain of the RFID reader.

19. The article of claim 15, wherein the operations further comprise basing a timing of the processing of the initial part of the second transmission at least partly on a duration of the first transmission.

20. The article of claim 15, wherein the operations further comprise basing a timing of the processing of the initial part of the second transmission at least partly on a duration of the initial part of the second transmission and at least partly on an expected duration of the final part of the first transmission.

* * * * *